US012803662B2

(12) United States Patent
Holness et al.

(10) Patent No.: US 12,803,662 B2
(45) Date of Patent: Nov. 17, 2026

(54) PON FAULT NOTIFICATION IN A MULTI-HOMED PROTECTION ENVIRONMENT

(71) Applicant: Ciena Corporation, Hanover, MD (US)

(72) Inventors: Marc Holness, Nepean (CA); Jean-Christophe Marion, Petaluma, CA (US); Claudio Lordello, Kanata (CA); Mohammad Furqan Haq, Ottawa (CA)

(73) Assignee: Ciena Corporation, Fulton, MD (US)

( * ) Notice: Subject to any disclaimer, the term of this patent is extended or adjusted under 35 U.S.C. 154(b) by 246 days.

(21) Appl. No.: 18/625,357

(22) Filed: Apr. 3, 2024

(65) Prior Publication Data

US 2025/0317199 A1 Oct. 9, 2025

(51) Int. Cl.
*H04B 10/032* (2013.01)

(52) U.S. Cl.
CPC .................................. *H04B 10/032* (2013.01)

(58) Field of Classification Search
CPC .... H04B 10/03; H04B 10/032; H04J 14/0287
USPC .................................................. 398/1, 5, 17
See application file for complete search history.

(56) References Cited

U.S. PATENT DOCUMENTS 5,859,716 A 1/1999 O'Sullivan et al.
5,959,749 A 9/1999 Danagher et al.
6,028,860 A 2/2000 Laubach et al.
6,081,533 A 6/2000 Laubach et al.
6,111,676 A 8/2000 Lemus et al.
6,137,793 A 10/2000 Gorman et al.
6,239,889 B1 5/2001 Harley et al.
6,323,978 B1 11/2001 Harley et al.
6,563,829 B1 5/2003 Lyles et al.
6,574,016 B1 6/2003 Harley et al.
6,580,498 B1 6/2003 Harley
6,700,903 B1 3/2004 Boyd et al.
6,801,547 B1 10/2004 Boyd et al.
6,859,622 B1 2/2005 Jiang et al.
6,917,614 B1 7/2005 Laubach et al.
(Continued)

FOREIGN PATENT DOCUMENTS

EP 4084492 A1 * 11/2022 ......... H04Q 11/0062
WO 2011/038591 A1 4/2011
WO 2017/144375 A1 8/2017

OTHER PUBLICATIONS

Westfall Ron, OFC 2024: Cisco Routed PON Debuts Uplifting Broadband Economics, The Futurum Group (Mar. 20, 2024) (Year: 2024).*

(Continued)

*Primary Examiner* — Kenneth N Vanderpuye
*Assistant Examiner* — Paul Morgan Brock
(74) *Attorney, Agent, or Firm* — Baratta Law PLLC; Lawrence A. Baratta, Jr.

(57) ABSTRACT

An Optical Line Terminal (OLT) includes a transmitter and a receiver, each connected to a Passive Optical Network (PON) having protection therein where the OLT is in a protection group with one or more additional OLTs, and wherein the OLT is in a Standby state; and circuitry configured to turn on the transmitter based on detection of a fault in the PON, and check if the fault is still detected after the transmitter is turned on, and, responsive to the fault not being detected after the state of the transmitter is turned on, change the OLT to an Active state.

17 Claims, 7 Drawing Sheets

(56) References Cited

U.S. PATENT DOCUMENTS

| | | | |
|---|---|---|---|
| 6,967,949 B2 | 11/2005 | Davis et al. | |
| 7,266,306 B1 | 9/2007 | Harley et al. | |
| 7,321,728 B2 | 1/2008 | Harley et al. | |
| 7,349,537 B2 | 3/2008 | Kramer et al. | |
| 7,525,982 B2 | 4/2009 | Kramer et al. | |
| 7,590,054 B1 | 9/2009 | Holness et al. | |
| 7,590,139 B2 | 9/2009 | Boyd et al. | |
| 7,599,400 B2 | 10/2009 | Roberts et al. | |
| 7,599,625 B1 | 10/2009 | Harley et al. | |
| 7,600,003 B1 | 10/2009 | Okmianski et al. | |
| 7,606,498 B1 | 10/2009 | Wu et al. | |
| 7,630,639 B2 | 12/2009 | Kramer et al. | |
| 7,664,019 B2 | 2/2010 | Boyd et al. | |
| 7,676,161 B2 | 3/2010 | Roberts et al. | |
| 7,765,288 B2 | 7/2010 | Bainbridge et al. | |
| 7,792,044 B2 | 9/2010 | Holness et al. | |
| 7,802,145 B1 | 9/2010 | Bainbridge et al. | |
| 7,894,721 B2 | 2/2011 | Roberts et al. | |
| 8,018,841 B2 | 9/2011 | Holness et al. | |
| 8,059,970 B2 | 11/2011 | Harley et al. | |
| 8,074,270 B1 | 12/2011 | Lordello | |
| 8,085,676 B2 | 12/2011 | Skalecki et al. | |
| 8,149,692 B2 | 4/2012 | Holness et al. | |
| 8,166,365 B2 | 4/2012 | Harley et al. | |
| 8,180,228 B1 | 5/2012 | Harley et al. | |
| 8,185,824 B1 | 5/2012 | Mitchell et al. | |
| 8,230,294 B2 | 7/2012 | Roberts et al. | |
| 8,295,175 B2 | 10/2012 | Ellis et al. | |
| 8,305,938 B2 | 11/2012 | Holness et al. | |
| 8,335,316 B2 | 12/2012 | Hirth et al. | |
| 8,433,795 B2 | 4/2013 | Wang et al. | |
| 8,509,061 B2 | 8/2013 | Holness et al. | |
| 8,553,697 B2 | 10/2013 | Allan et al. | |
| 8,588,060 B2 | 11/2013 | Holness | |
| 8,588,257 B2 | 11/2013 | Boyd et al. | |
| 8,625,410 B2 | 1/2014 | Abdullah et al. | |
| 8,656,026 B1 | 2/2014 | Prasad et al. | |
| 8,675,488 B1 | 3/2014 | Sidebottom et al. | |
| 8,737,198 B1 | 5/2014 | Holness et al. | |
| 8,737,834 B2 | 5/2014 | Boyd et al. | |
| 8,744,261 B2 | 6/2014 | Hirth et al. | |
| 8,792,509 B2 | 7/2014 | Martin et al. | |
| 8,798,470 B2 | 8/2014 | Boyd et al. | |
| 8,848,523 B2 | 9/2014 | Boyd et al. | |
| 8,855,122 B2 | 10/2014 | Bottorff et al. | |
| 8,879,904 B1 | 11/2014 | Harley et al. | |
| 8,903,250 B2 | 12/2014 | Boyd et al. | |
| 8,942,561 B2 | 1/2015 | Boyd et al. | |
| 8,953,456 B2 | 2/2015 | Mohan et al. | |
| 8,964,538 B2 | 2/2015 | Kramer et al. | |
| 8,964,782 B2 | 2/2015 | Harley et al. | |
| 8,983,309 B2 | 3/2015 | Harley et al. | |
| 9,025,435 B2 | 5/2015 | Holness et al. | |
| 9,075,717 B2 | 7/2015 | Mohan, Jr. et al. | |
| 9,106,438 B2 | 8/2015 | Davis et al. | |
| 9,113,237 B2 | 8/2015 | Boyd et al. | |
| 9,130,878 B2 | 9/2015 | Boyd et al. | |
| 9,148,224 B2 | 9/2015 | Diab et al. | |
| 9,160,563 B2 | 10/2015 | Ryoo et al. | |
| 9,197,493 B2 | 11/2015 | Holness et al. | |
| 9,203,549 B2 | 12/2015 | Holness et al. | |
| 9,203,644 B2 | 12/2015 | Holness et al. | |
| 9,209,925 B2 | 12/2015 | Dobozy et al. | |
| 9,258,190 B2 | 2/2016 | Swinkels et al. | |
| 9,319,268 B2 | 4/2016 | Allan et al. | |
| 9,319,758 B2 | 4/2016 | Goswami et al. | |
| 9,337,929 B2 | 5/2016 | Boyd et al. | |
| 9,344,323 B2 | 5/2016 | Civil et al. | |
| 9,401,817 B2 | 7/2016 | Holness et al. | |
| 9,413,466 B2 | 8/2016 | Boyd et al. | |
| 9,432,753 B2 | 8/2016 | Hirth et al. | |
| 9,455,785 B2 | 9/2016 | Boyd et al. | |
| 9,479,621 B2 | 10/2016 | Kliger et al. | |
| 9,531,562 B2 | 12/2016 | Currivan et al. | |
| 9,553,744 B2 | 1/2017 | Prodan et al. | |
| 9,577,758 B2 | 2/2017 | Boyd | |
| 9,596,041 B2 | 3/2017 | Currivan et al. | |
| 9,681,209 B2 | 6/2017 | Boyd | |
| 9,774,394 B2 | 9/2017 | Harley et al. | |
| 9,859,984 B2 | 1/2018 | Harley et al. | |
| 9,893,937 B2 | 2/2018 | Holness et al. | |
| 9,960,993 B2 | 5/2018 | Hu et al. | |
| 10,122,619 B2 | 11/2018 | Holness et al. | |
| 10,236,981 B2 | 3/2019 | Harley et al. | |
| 10,263,867 B2 | 4/2019 | Holness et al. | |
| 10,382,134 B2 | 8/2019 | Boyd et al. | |
| 10,425,153 B2 | 9/2019 | Holness et al. | |
| 10,476,763 B2 | 11/2019 | Holness | |
| 10,541,877 B2 | 1/2020 | Bainbridge et al. | |
| 10,623,293 B2 | 4/2020 | Hu et al. | |
| 10,652,024 B2 | 5/2020 | Holness | |
| 10,715,888 B2 | 7/2020 | Swinkels et al. | |
| 10,771,872 B2 | 9/2020 | Boyd | |
| 10,819,646 B2 | 10/2020 | Srivastava et al. | |
| 10,826,813 B2 | 11/2020 | Holness | |
| 10,862,963 B2 | 12/2020 | Boyd et al. | |
| 10,863,256 B2 | 12/2020 | Boyd et al. | |
| 10,985,900 B1 | 4/2021 | Abdo et al. | |
| 11,038,549 B1 | 6/2021 | Harley et al. | |
| 11,277,206 B1 | 3/2022 | Oveis Gharan et al. | |
| 11,336,367 B1 | 5/2022 | Oveis Gharan et al. | |
| 11,595,302 B2 | 2/2023 | Ramsland et al. | |
| 11,658,900 B2 | 5/2023 | Holness et al. | |
| 2005/0068950 A1 | 3/2005 | Ellis et al. | |
| 2005/0071453 A1 | 3/2005 | Ellis et al. | |
| 2005/0099949 A1 | 5/2005 | Mohan et al. | |
| 2005/0099951 A1 | 5/2005 | Mohan et al. | |
| 2005/0099954 A1 | 5/2005 | Mohan et al. | |
| 2005/0099955 A1 | 5/2005 | Mohan et al. | |
| 2007/0064700 A1 | 3/2007 | Holness et al. | |
| 2007/0268817 A1 | 11/2007 | Smallegange et al. | |
| 2010/0027769 A1 | 2/2010 | Stevens et al. | |
| 2010/0098412 A1 | 4/2010 | Boyd et al. | |
| 2010/0135291 A1 | 6/2010 | Martin et al. | |
| 2011/0222854 A1 | 9/2011 | Roberts et al. | |
| 2011/0262132 A1 | 10/2011 | Grindley et al. | |
| 2012/0092985 A1 | 4/2012 | Caird et al. | |
| 2012/0281710 A1 | 11/2012 | Holness et al. | |
| 2013/0202286 A1 | 8/2013 | Boyd et al. | |
| 2013/0202304 A1 | 8/2013 | Boyd et al. | |
| 2013/0315238 A1 | 11/2013 | Lamb et al. | |
| 2013/0315593 A1 | 11/2013 | Lamb et al. | |
| 2014/0072304 A1 | 3/2014 | Boyd et al. | |
| 2014/0133855 A1 | 5/2014 | Chaffins et al. | |
| 2014/0177439 A1 | 6/2014 | Holness et al. | |
| 2015/0046775 A1 | 2/2015 | Prodan et al. | |
| 2015/0256284 A1 | 9/2015 | Laubach et al. | |
| 2016/0164632 A1 | 6/2016 | Oveis Gharan et al. | |
| 2016/0352570 A1 | 12/2016 | Holness | |
| 2018/0331931 A1 | 11/2018 | Holness | |
| 2019/0116096 A1 | 4/2019 | Holness et al. | |
| 2020/0036468 A1 | 1/2020 | Roberts et al. | |
| 2021/0036910 A1 | 2/2021 | Holness | |
| 2021/0226816 A1 | 7/2021 | Holness | |
| 2021/0377139 A1 | 12/2021 | Holness et al. | |
| 2021/0385120 A1 | 12/2021 | Curtis et al. | |
| 2022/0294538 A1 | 9/2022 | Harley et al. | |
| 2022/0294604 A1 | 9/2022 | Oveis Gharan et al. | |
| 2023/0198878 A1 | 6/2023 | Boyd et al. | |
| 2024/0413899 A1* | 12/2024 | Reuche | H04B 10/03 |

OTHER PUBLICATIONS

Claudio Desanti et al., "Super-PON: an evolution for access networks," Journal Optical Communications and Networking, Research Article, vol. 12, No. 10, Oct. 2020, pp. 66-77.

ITU-T Telecommunication Standardization Sector of ITU, G.989.3, "40-Gigabit-capable passive optical networks (NG-PON2): Transmission convergence layer specification," Series G: Transmission Systems and Media, Digital Systems and Networks, Digital sections and digital line system—Optical line systems for local and access networks, May 2021, pp. 1-280.

(56) References Cited

OTHER PUBLICATIONS

ITU Publications, International Telecommunication Union, ITU-T G.9807.1, "10-Gigabit-capable symmetric passive optical network (XGS-PON)," Series G: Transmission systems and media, digital systems and networks, Access networks—Optical line systems for local and access networks, Feb. 2023, pp. 1-290.

ITU-T Telecommunication Standardization Sector of ITU, G.984.1, "Gigabit-capable passive optical networks (GPON): General characteristics," Series G: Transmission systems and media, digital systems and networks, Mar. 2008, pp. 1-43.

ITU-T Telecommunication Standardization Sector of ITU, Series G Supplement 51, "Passive optical network protection considerations," Series G: Transmission systems and media, digital systems and networks, May 2012, pp. 1-36.

Jul. 10, 2025, International Search Report and Written Opinion for International Patent Application No. PCT/US2025/021940.

* cited by examiner

PON FAULT NOTIFICATION IN A MULTI-HOMED PROTECTION ENVIRONMENT

FIELD OF THE DISCLOSURE

The present disclosure relates generally to Passive Optical Network (PON) techniques. More particularly, the present disclosure relates to systems and methods for PON fault notification in a multi-homed protection environment.

BACKGROUND OF THE DISCLOSURE

The PON architecture implements a point-to-multipoint topology in which a single optical fiber serves multiple endpoints by using unpowered (passive) fiber optic splitters to divide the fiber bandwidth among the endpoints. A PON network includes one or more Optical Line Terminals (OLT) at the service provider's central office, optical splitters in the field, and Optical Network Units (ONUs) or Optical Network Terminals (ONTs) at the endpoints (e.g., customer premises). Redundancy in a PON network, especially between OLTs, is aimed at minimizing service interruptions by providing alternative paths for data in case of hardware failure, maintenance, or damage to the physical infrastructure. A multi-homed environment means multiple OLTs service the same set of ONUs or ONTs, where one OLT is active, and the rest are standby. There is a requirement for coordination between the multi-homed OLTs to ensure only one is active at a time. Conventional approaches include an inter-OLT communication channel where the OLTs can communicate to one another for operational status or a faulted OLT turning off its data connectivity so that another OLT can become active through higher layer techniques. Disadvantageously, the inter-OLT communication channel takes switch or router ports, which could be used for data traffic. Having the faulted OLT turn off its data connectivity is slower as it relies on data path Media Access Control (MAC) learning, and this also removes the OLT from network connectivity for management.

BRIEF SUMMARY OF THE DISCLOSURE

The present disclosure relates to systems and methods for PON fault notification in a multi-homed protection environment. In particular, the present disclosure includes novel techniques used for locally hosted OLTs, that are connected to a switch/router, to notify the switch/router of state changes of the OLT to support protection switching strategies. As described herein, locally hosted means the OLTs are modules, e.g., line modules, pluggable modules, etc., hosted by a switch/router. These locally hosted OLTs are configured to communicate status to the switch/router without the disadvantages of the inter-OLT communication channel and the data path learning. That is, the approach described herein is quick, similar to the inter-OLT communication channel, and efficient due to the OLTs being locally hosted, i.e., without wasting data ports on the switch/router as with the inter-OLT communication channel.

In an embodiment, an Optical Line Terminal (OLT) includes a transmitter and a receiver, each connected to a Passive Optical Network (PON) having protection therein where the OLT is in a protection group with one or more additional OLTs, and wherein the OLT is in a Standby state; and circuitry configured to turn on the transmitter based on detection of a fault in the PON, and check if the fault is still detected after the transmitter is turned on, and, responsive to the fault not being detected after the state of the transmitter is turned on, change the OLT to an Active state. The circuitry can be further configured to, responsive to the fault still being detected after the transmitter is turned on, turn off the transmitter. The circuitry can be further configured to, subsequent to changing the OLT to an Active state, notify a router associated with the OLT of the Active state. The circuitry can be further configured to maintain a state of the OLT as one of the Standby state and the Active state, without coordination with the one or more additional OLTs. The OLT can be a pluggable module being housed in an associated router. The circuitry can be further configured to communicate the change to the Active state by toggling or pulsing a pin between the pluggable module and the associated router. The circuitry can be further configured to, responsive to a request from an associated router, communicate a status to the associated router. The status can be communicated by the associated router reading a register in the circuitry.

In another embodiment, a method includes, in an Optical Line Terminal (OLT) including a transmitter and a receiver, each connected to a Passive Optical Network (PON) having protection therein where the OLT is in a protection group with one or more additional OLTs, wherein the OLT is in a Standby state, turning on the transmitter based on detection of a fault in the PON; and checking if the fault is still detected after the transmitter is turned on, and, responsive to the fault not being detected after the state of the transmitter is turned on, changing the OLT to an Active state. The method can further include, responsive to the fault still being detected after the transmitter is turned on, turning off the transmitter. The method can further include, subsequent to changing the OLT to an Active state, notifying a router associated with the OLT of the Active state. The method can further include maintaining a state of the OLT as one of the Standby state and the Active state, without coordination with the one or more additional OLTs. The OLT can be a pluggable module being housed in an associated router. The method can further include communicating the changing to the Active state by toggling or pulsing a pin between the pluggable module and the associated router. The method can further include, responsive to a request from an associated router, communicating a status to the associated router. The status can be communicated by the associated router reading a register in the circuitry.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for PON fault notification in a multi-homed protection environment. In particular, the present disclosure includes:

(1) A fault notification scheme that ensures OLTs within a protection group only have one Active as the result of faults within the PON network.

(2) Real-time fault notification signals from the OLT to the host switch/router that use pin (e.g., Loss of Signal (LOS) pin) toggling to communicate state changes, leveraging the local hosting of the OLT in the host.

(3) Continually, but relatively speaking more slowly, make information available to the host switch/router of the current state of the OLT (e.g., via a register with Inter-Integrated Circuit (I2C) bus access).

(4) A protection switching scheme that does not require a messaging channel between multi-homed switches/routers to coordinate the switchover of traffic due to a fault within the PON.

PON Network with Multi-Homed OLTs

Figure 1:
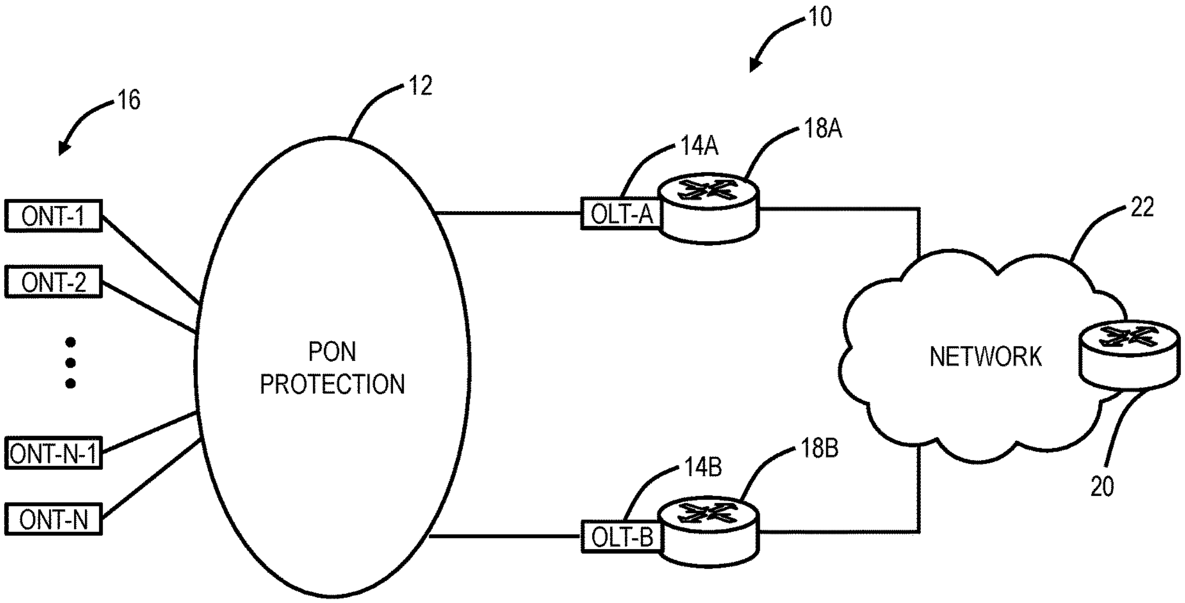
FIG. 1 is a network diagram of a PON network with PON protection and dual-homed OLTs.

FIG. 1 is a network diagram of a PON network 10 with PON protection 12 and dual-homed OLTs 14A, 14B. The PON network 10 can include Gigabit Passive Optical Network (GPON) and Ethernet Passive Optical Network (EPON), also known as Gigabit Ethernet Passive Optical Network (GEPON). GPON is defined by the ITU-T through a series of G.984.x standards, whereas EPON is defined by the IEEE as part of the Ethernet standard, specifically under the 802.3ah specification. The OLTs 14A, 14B connect to various ONTs 16 (labeled ONT-1, ONT-2, . . . , ONT-N−1, ONT-N). Note, ONT is an ITU-T term, whereas ONU is an IEEE term. The present disclosure utilizes ONT, but those skilled in the art will appreciate the present disclosure contemplates operation with GPON, EPON, etc. In FIG. 1, the OLTs 14A, 14B are associated with routers 18A, 18B, respectively which connect to a router 20 via a data network 22. For illustration purposes, the present disclosure uses the term router for the routers 18A, 18B, 20, but those skilled in the art will appreciate these can be switches or other types of network elements, capable of packet switching, etc.

The PON protection 12 contemplates any type of protection and includes physically diverse paths between the ONTs 16 and both the OLTs 14A, 14B. For example, the PON protection 12 can include various passive splitters and combiners so that both OLTs 14A, 14B are connected to all of the ONTs 16. Again, the PON network 10 is a point-to-multipoint configuration, and, with the PON protection 12, the point side actually includes multiple points for redundancy. Note, the PON network 10 is a dual-homed configuration, i.e., the dual-homed OLTs 14A, 14B connected to the ONTs 16 via the PON protection 12. The present disclosure also contemplated multi-homed as well, i.e., in a multi-homed configuration, there are a plurality of OLTs 14. That is, a dual-homed configuration includes two while a multi-homed configuration includes two or more, i.e., is not limited to two.

ITU-T G.984.1 outlines several topologies for achieving redundancy; these have been named Type A, Type B, Type C and Type D, and further details are described in Supplement 51, Series G, Passive optical network protection considerations, May 2012, the contents of which are incorporated by reference in their entirety. The present disclosure contemplates any type of PON protection which includes a multi-homed configuration, i.e., a plurality of OLTs.

A key aspect of the PON protection 12 in the multi-homed configuration is that only one of the OLTs 14A, 14B should be active at a time. That is, since the OLTs 14A, 14B share fibers to get to the ONTs 16, having more than one OLT 14A, 14B active at a time will cause the optical signals to interfere with one another. Again, there are generally two conventional approaches to ensure only one OLT 14A, 14B is active at a time. A first approach is to turn off the OLT 14A, 14B when there is a fault on the active one, so the standby OLT can become active. However, this approach is slow as it relies on data path learning. The objective of any protection is quick (e.g., on par with 50 millisecond switching). As such, the present disclosure focuses on status communication between the OLTs 14A, 14B, i.e., communication of state changes to support protection switching.

In FIG. 1, the OLTs 14A, 14B are separate and each connected to the routers 18A, 18B, respectively, and participate in a PON protection scheme providing Active/Standby PON connectivity to the ONTs 16, via the PON protection 12. If a fault occurs within the PON protection 12 that prevents the OLT 14A (i.e., the primary which is initially Active) from establishing/maintaining data path connectivity to the downstream ONTs 16, then the backup/standby OLT 14B will attempt to become Active and re-establish data path connectivity to the downstream ONTs 16. In doing so however, the newly active OLT 14B also needs to send a notification to the router 18B, so that the router 18B can perform the appropriate signaling across the (aggregation) network 22 to ensure the end-to-end service can also be re-established and provide successful end-to-end data traffic delivery.

Figure 2:
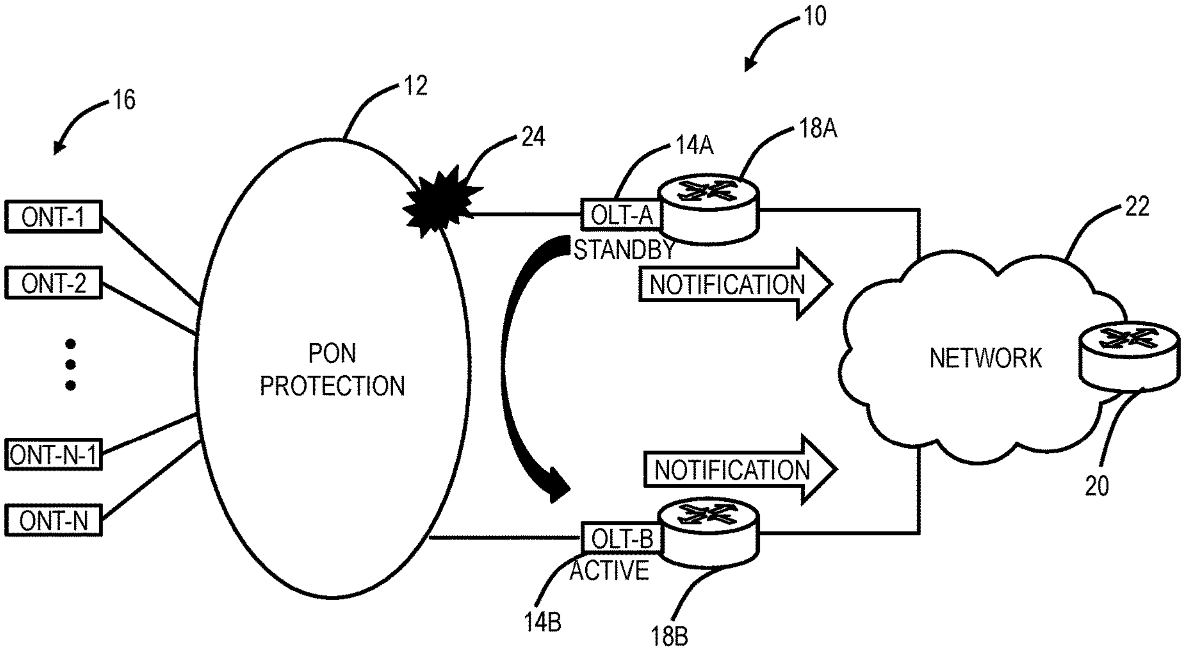
FIG. 2 is a network diagram of the network illustrating a fault causing a protection switch.

FIG. 2 is a network diagram of the network 10 illustrating a fault 24 causing a protection switch. The fault 24 can be anything causing a disruption between the OLT 14A and the ONTs 16, e.g., a fiber cut, an equipment problem (splitter, combiner, coupler, etc.), a laser or receive failure at the OLT 14A, and the like. It is imperative that both OLTs 14A, 14B participating in the protection group are not simultaneously Active and provide active status notifications to their respective host, i.e., the routers 18A, 18B. In traditional packet technologies, this is often referred to as the "split brain" problem. The "split brain" problem in routers refers to a situation where two or more network components that are designed to work together as a coherent system lose connectivity with each other and operate independently.

As such, the present disclosure provides mechanisms to support the signaling required to notify the routers 18A, 18 (or switches) participating in the multi-homed resiliency scheme of the status (e.g., Active/Standby) of the attached OLTs 14A, 14B. The objective is to always have an Active/Standby configuration and never an Active/Active configuration.

Figure 3:
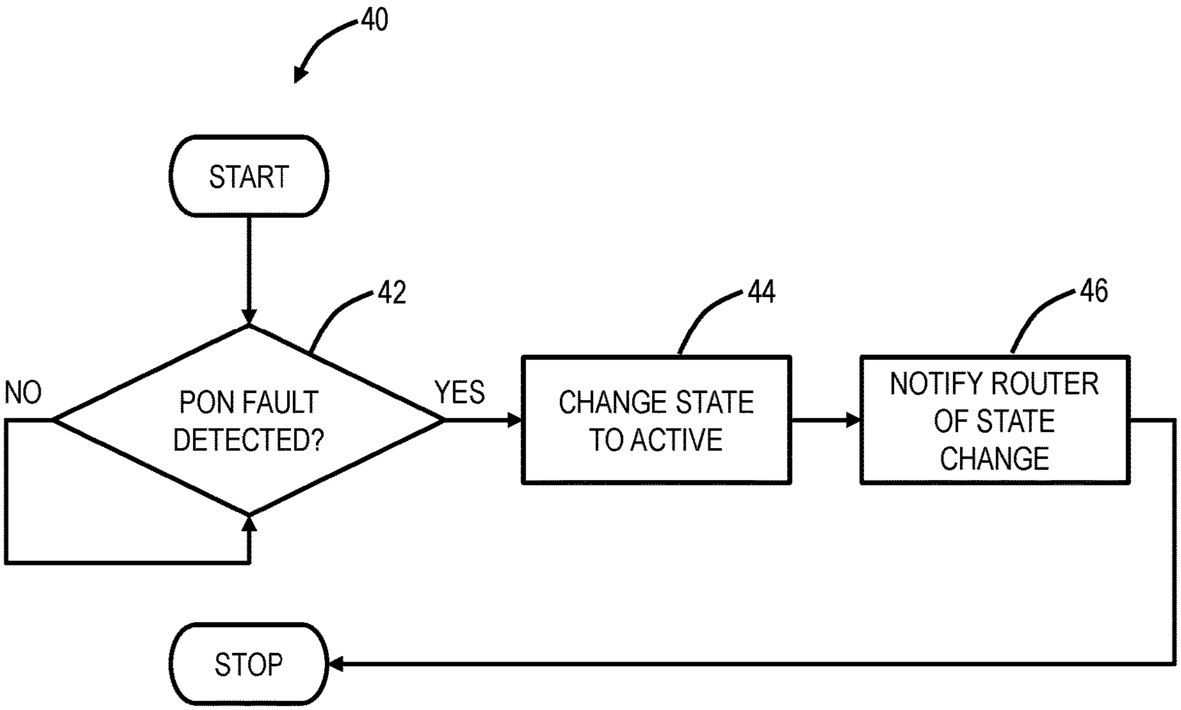
FIG. 3 is a flowchart of a standby OLT fault detection process that is common to OLT designs but insufficient to prevent occurrences of Active/Active state of OLTs within a common protection group.

FIG. 3 is a flowchart of a standby OLT fault detection process 40 that is common to OLT designs but insufficient to prevent occurrences of Active/Active state of OLTs within a common protection group. The standby OLT fault detection process 40 is implemented by any of the OLTs 14, when in a standby state. The standby OLT fault detection process 40 includes detecting a PON fault (step 42). The present disclosure contemplates any technique for detecting faults, including, e.g., communication between the OLTs 14, link monitoring, network performance threshold monitoring, alerts such as from a management system or PON controller, manual triggering, or any other approach.

When there is a PON fault (step 42), the standby OLT fault detection process 40 includes changing the status of the standby OLT to active (step 44), and notifying the router 18B of the state change (step 46).

Figure 4:
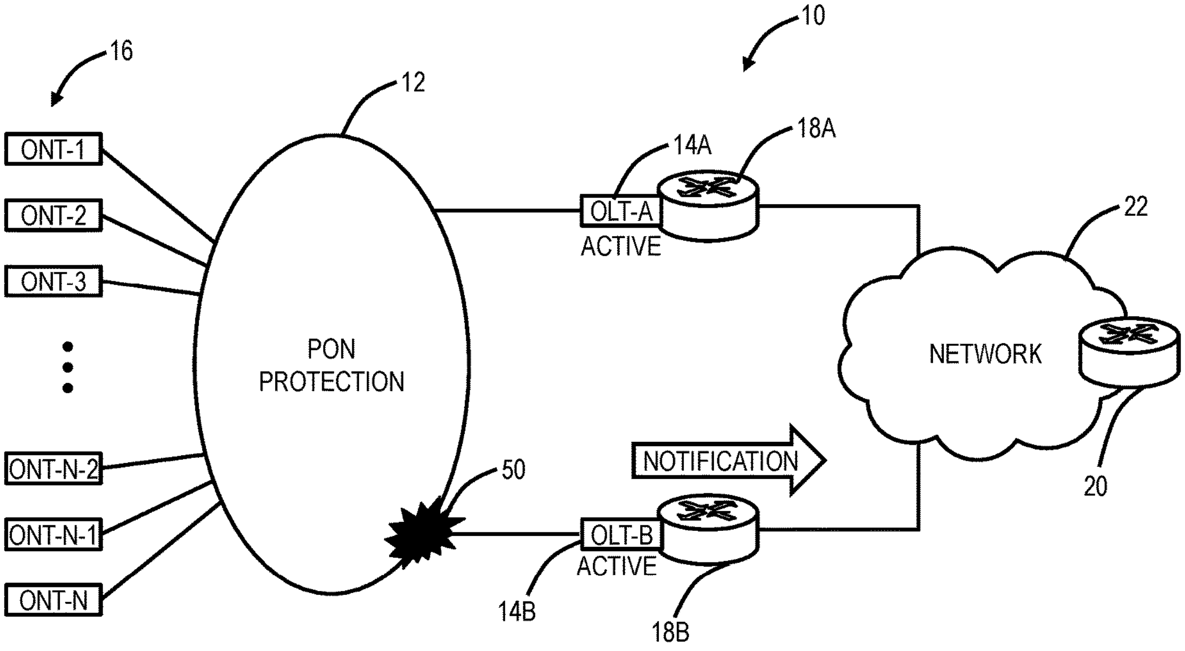
FIG. 4 is a network diagram of the network illustrating a PON fault resulting in an Active/Active state, using the standby OLT fault detection process of FIG. 3.

However, the standby OLT fault detection process 40 is not sufficient to prevent an Active/Active configuration in all situations. For example, consider a fault scenario as illustrated in FIG. 4, which is a network diagram of the network 10 illustrating a PON fault 50 resulting in an Active/Active state, using the standby OLT fault detection process 40. Here, the standby OLT 14B detects the PON fault 50, but this fault 50 does not affect the OLT 14A, which is active and remains active. Scenarios of this class could result in the standby OLT 14B to become active. However, the primary Active OLT 14A already has an established data path setup with the downstream ONTs 16.

OLT Implementation as a Module

In various embodiments, the OLTs 14A, 14B are modules that physically reside in the routers 18A, 18B (or switches). The modules can be line modules, blades, as well as pluggable modules, i.e., OLT on a plug. Conventional OLTs are typically in a separate network device from the routers 18A, 18B and connect thereto via data ports. The present disclosure contemplates the OLT 14A, 14B as a pluggable module hosted by the routers 18A, 18, supporting higher density and flexibility.

PON Fault Notification

In general, only one entity is responsible for determining the OLT state, and that is the OLT 14A, 14B itself. Again, the OLTs 14A, 14B are modules physically hosted in the routers 18A, 18B. As such, the present disclosure does not require turning off the connectivity between the OLTs 14A, 14B and the routers 18A, 18B, when in the standby state, nor does it require extra data ports for connectivity therebetween.

To communicate state information between the OLTs 14A, 14B and the routers 18A, 18B, respectively, the OLT 14A, 14B can one of (a) send a [Ethernet] message to the host 18A, 18B with status information contained therein, (b) embed status information in existing low level link messages (e.g., Link Layer Discovery Protocol (LLDP)), or (c) toggle/pulse a [e.g., Loss of Signal (LOS)] pin in real-time on the host router 18A, 18B to indicate a status/state change in the OLT.

The OLT 14A, 14B may also maintain its actual state and make it readable by the host router 18A, 18B, e.g., via I2C registers. That is, options (a)-(c) above allow the OLT 14A, 14B to communicate a status or state change to the routers 18A, 18B, whereas the router 18A, 18B can also poll and ask for a status or current state. Again, as described herein, status and state refer to the same concept—am I Active or Standby.

The OLT 14A, 14B will use information about the PON to determine if a state change is necessary. Of note, because the OLTs 14A, 14B are pluggable devices within the routers 18A, 18B, the notification scheme is quick, efficient, does not require a dedicated inter-OLT communication channel. The above notification approaches allow the standby OLT to remain connected to the routers 18 while in the Standby state. Specifically, FIG. 5 illustrates a process 50 for ensuring the notifications are properly provided to the routers 18A, 18B, to ensure there is only one Active OLT at a time.

That is, the OLTs 14 support two functions-PON and Ethernet switching. When in Standby, the PON is off, but the Ethernet switching remains, for management.

PON Fault Notification Process

Figure 5:
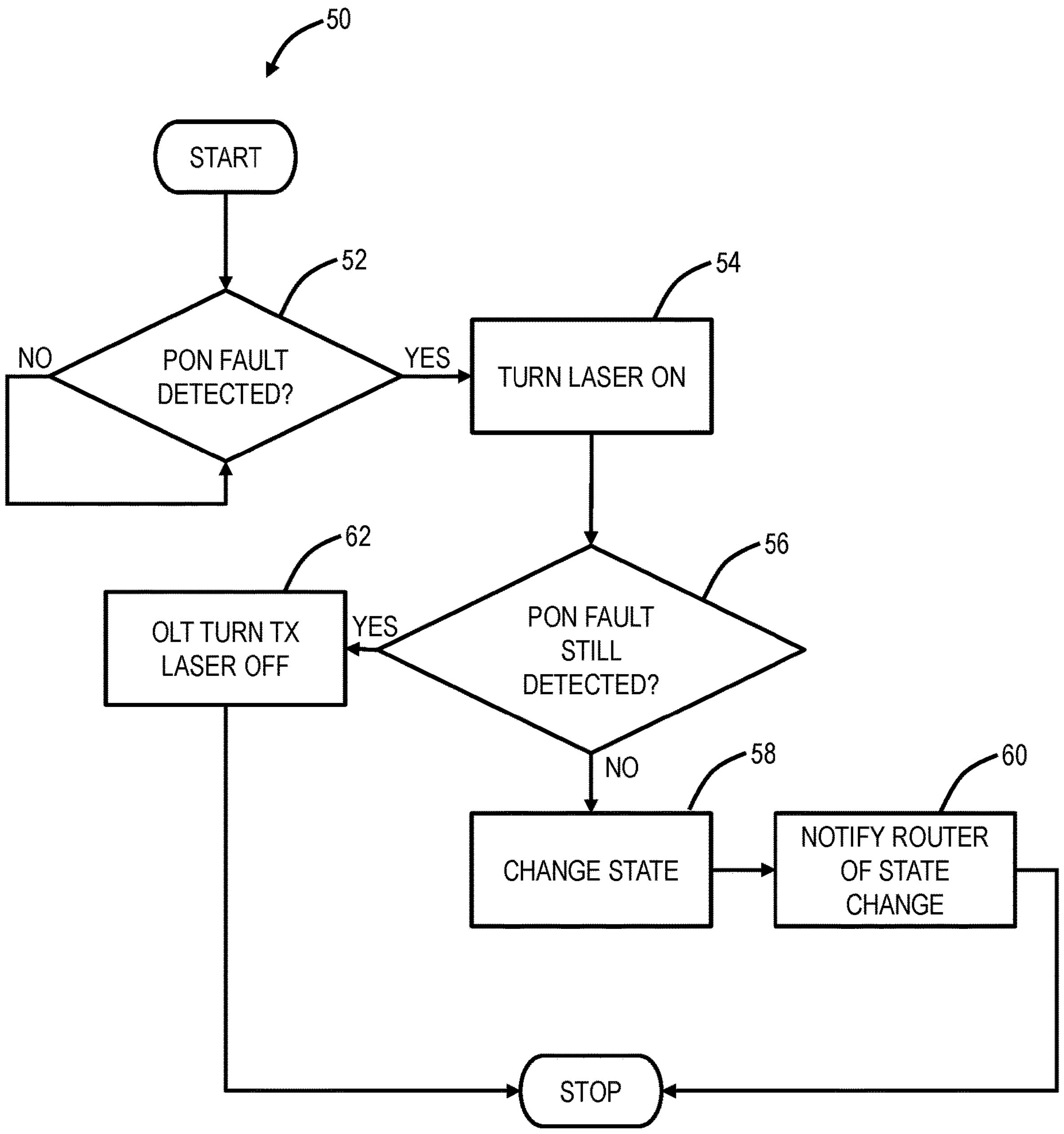
FIG. 5 is a flowchart of an OLT fault detection process with two steps, to ensure there is no Active/Active situations.

FIG. 5 is a flowchart of an OLT fault detection process 50 with two steps, to ensure there is no Active/Active situations. Specifically, the logic/steps in the OLT fault detection process 50 prevent OLTs within an active protection group from inadvertently being in an Active/Active situation. The OLT fault detection process 50 is implemented by the OLTs 14A, 14B that are standby OLTs when there is a PON fault detected. Specifically, the objective of the OLT fault detection process 50 is to leverage the fact the OLTs 14A, 14B are locally hosted in the routers 18A, 18B, and to ensure there is no "split brain" scenario, without requiring an explicit communication channel between the OLTs 14A, 14B for coordination.

The OLT fault detection process 50 includes monitoring to detect a PON fault (step 52). Again, the present disclosure contemplates any technique for detecting faults, including, e.g., communication between the OLTs 14, link monitoring, network performance threshold monitoring, alerts such as from a management system or PON controller, manual triggering, or any other approach.

Responsive to detecting the PON fault (step 52), the OLT fault detection process 50 includes the OLT turning on its laser (step 54). Again, the standby OLT independently manages its current state from the active OLT and performs this step 54 to turn the laser on based on the detected PON fault at step 52.

Now, the key here is there is no immediate notification of the state change to the router 18. Instead, the OLT fault detection process 50 includes monitoring to determine if the PON fault still is there after the laser has been turned on (step 56). So, there is a second step of determining whether the PON fault is detected after the laser is turned on. The second step 56 of detection is relevant for the Standby OLT trying to go Active. At steps 52, 54, the standby OLT just detected a fault on the PON, and, as result, it just turned its laser ON, i.e., toggling the laser at the Standby OLT means turning it ON. The step 56 here is to check if that helped with the situation. In most cases, it will help, and the PON activity will restart. This would lead the OLT to confirm its transition to Active, by changing its state from Standby to Active (step 42) and notifying the router of state change (step 60). But if the PON activity does not come back, the OLT should turn its laser OFF (step 62), to avoid the Active/Active situation.

Figure 6:
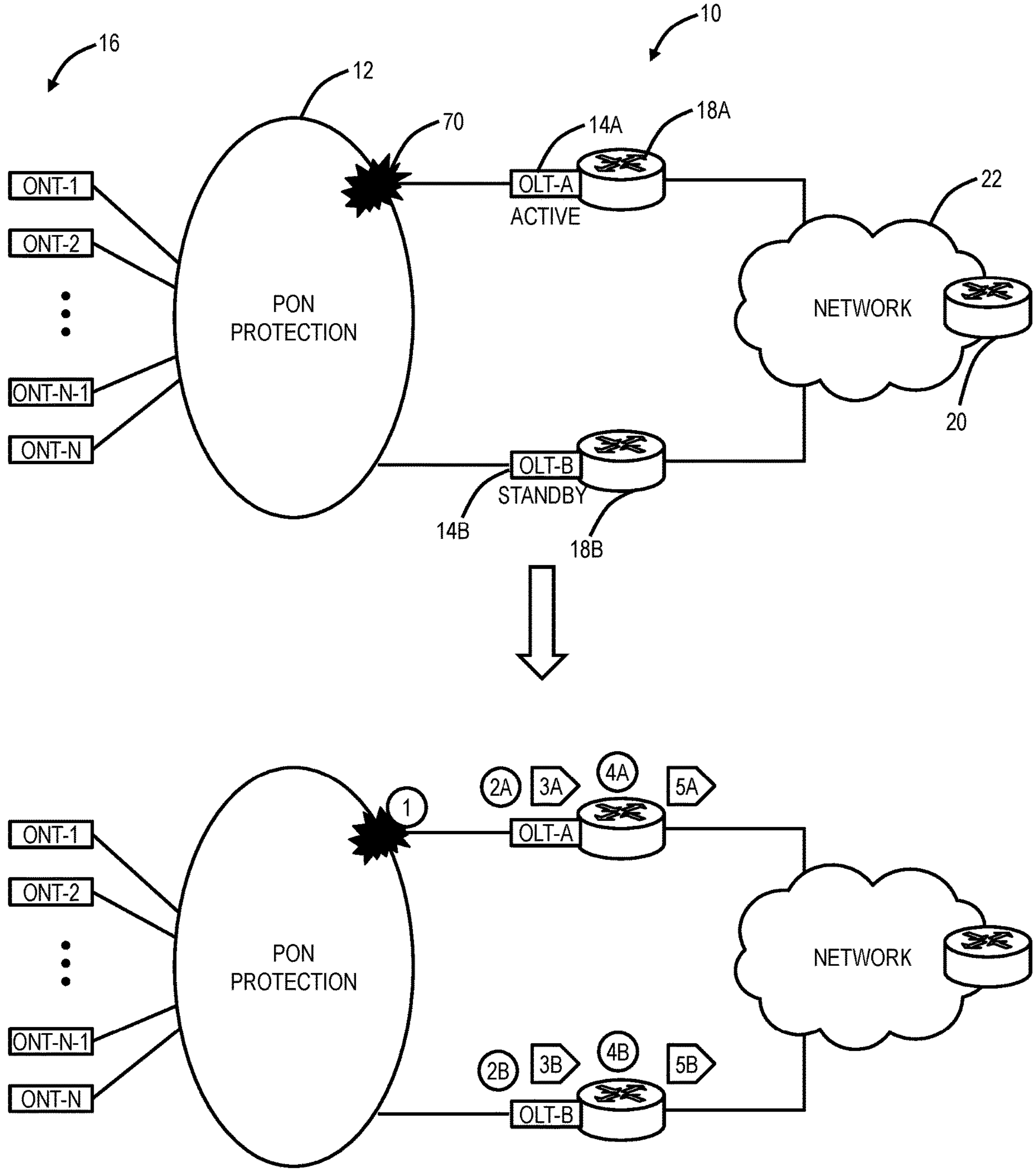
FIG. 6 is a network diagram of the network illustrating a fault switching scenario based on the OLT fault detection process.

As such, there is no need for explicit communication between the OLTs 14A, 14B, to avoid the Active/Active situation. That is, a standby OLT will not change its state unless it turns its laser on and Example Operations FIG. 6 is a network diagram of the network 10 illustrating a fault switching scenario based on the OLT fault detection process 50. That is, the operating principles of this present disclosure can be best described using an example and showing the sequence of events. For example, consider a typical fault 70 in the PON which would cause traffic to switch from a previously Active OLT to a newly Active (previously Standby) OLT.

Step (1)—A fault occurs within the PON that prevents the OLT-A (the OLT 14A) from establishing connectivity to the downstream ONTs 16.

At the OLT-A (the OLT 14A) which is Active:

Step (2A)—the OLT 14A detects the fault 70.

Step (3A)—the OLT 14A executes logic in the OLT fault detection process 50. This includes the OLT 14A turning off its laser since it was Active.

Step (4A)—the OLT 14A notifies the router 18A of the state change, from Active to Standby.

Step (5A)—the router 18A performs necessary signaling into the network 22.

At the OLT-B (the OLT 14B) which is Standby:

Step (2B)—the OLT 14B detects the fault 70.

Step (3B)—the OLT 14B executes logic in the OLT fault detection process 50. This includes the OLT 14B turning on its laser since it was Standby. After turning on the laser, the OLT 14B checks and determines the fault is no longer present.

Step (4B)—since the fault is no longer present, the OLT 14B notifies the router 18B of the state change, from Standby to Active.

Step (5B)—the router 18B performs necessary signaling into the network 22.

Figure 7:
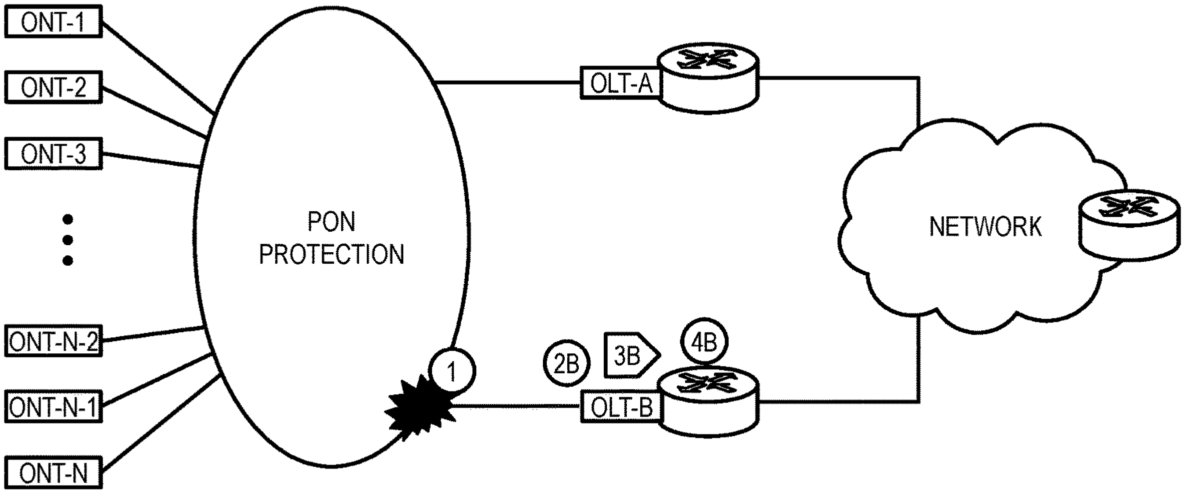
FIG. 7 is a network diagram of the network illustrating a problematic scenario to avoid both OLTs from establishing an Active state.

FIG. 7 is a network diagram of the network 10 illustrating a problematic scenario to avoid both OLTs from establishing an Active state. Here, the OLT-A is Active and the OLT-B is Standby. At Step (1)—A fault occurs within the PON that prevents the OLT-B (which is already in Standby) from establishing connectivity to the downstream ONTs. The OLT-A maintains connectivity to the downstream ONTs.

The OLT-B performs the following:

Step (2B)—the OLT 14B detects fault.

Step (3B)—the OLT 14B executes logic in the OLT fault detection process 50. This includes the OLT 14B turning on its laser since it was Standby. After turning on the laser, the OLT 14B checks and determines the fault is still present. Since there is no state change, no notification is dispatched to the host router 18B.

OLT Process

Figure 8:
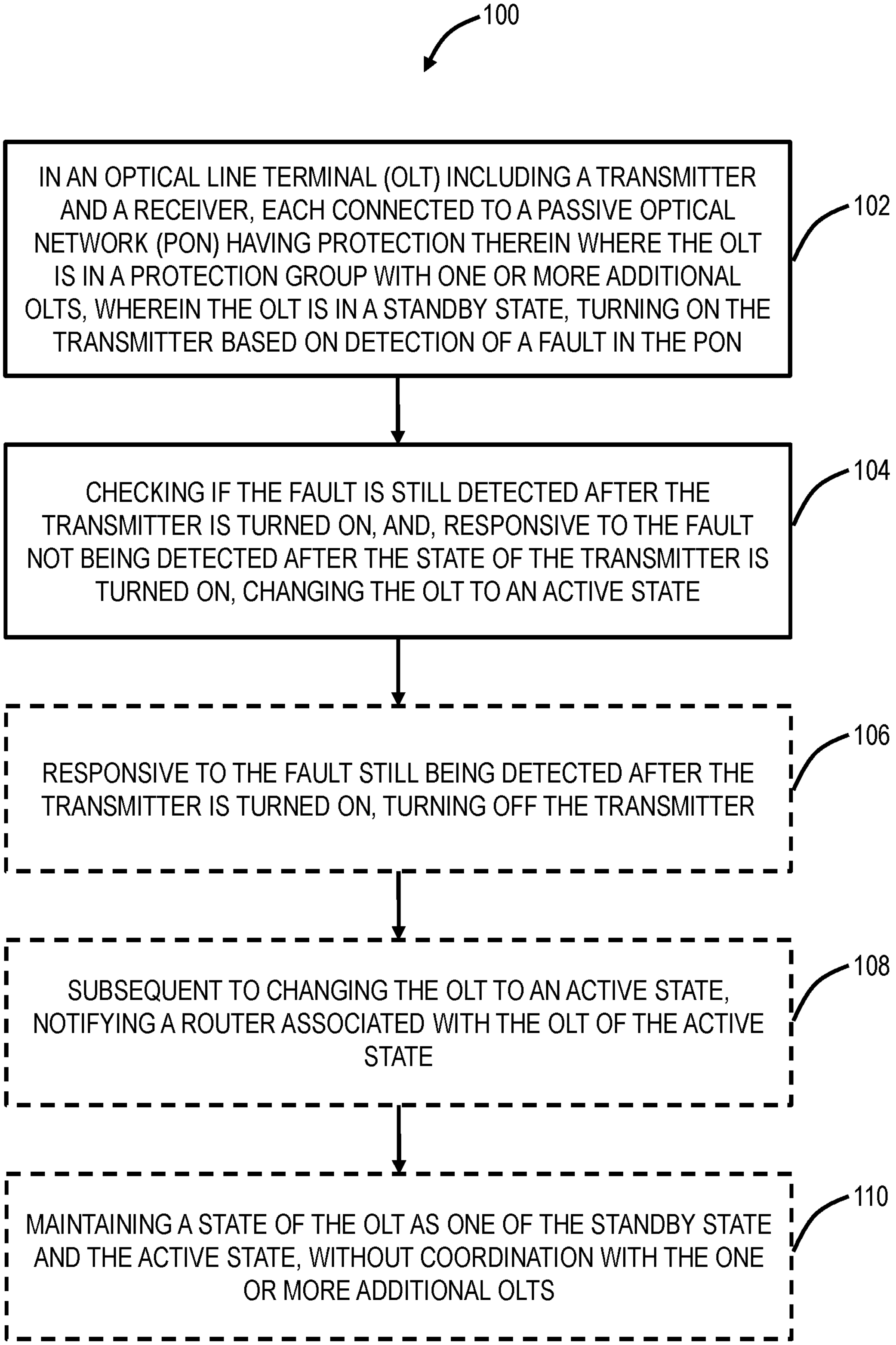
FIG. 8 is a flowchart of a process implemented by an OLT based on PON faults.

FIG. 8 is a flowchart of a process 100 implemented by an OLT based on PON faults. The process 100 is implemented by an OLT in a multi-homed configuration with other OLTs. The process 100 includes, in an Optical Line Terminal (OLT) including a transmitter and a receiver, each connected to a Passive Optical Network (PON) having protection therein where the OLT is in a protection group with one or more additional OLTs, wherein the OLT is in a Standby state, turning on the transmitter based on detection of a fault in the PON (step 102); and checking if the fault is still detected after the transmitter is turned on, and, responsive to the fault not being detected after the state of the transmitter is turned on, changing the OLT to an Active state (step 104).

The process 100 can further include, responsive to the fault still being detected after the transmitter is turned on, turning off the transmitter (step 106). The process 100 can further include, subsequent to changing the OLT to an Active state, notifying a router associated with the OLT of the Active state (step 108). The process 100 can further include maintaining a state of the OLT as one of the Standby state and the Active state, without coordination with the one or more additional OLTs (step 110).

The OLT can be a pluggable module being housed in an associated router. The process 100 can further include communicating the change to the Active state by toggling or pulsing a pin between the pluggable module and the associated router. The process 100 can further include responsive to a request from an associated router, communicating a status to the associated router. The status can be communicated by the associated router reading a register in the circuitry.

In another embodiment, an OLT includes a transmitter and a receiver, each connected to a Passive Optical Network (PON) having protection therein where the OLT is in a protection group with one or more additional OLTs; and circuitry configured to implement the process 100.

In a further embodiment, an OLT, in a pluggable module configured to operate in one of a switch and a router, includes a transmitter and a receiver, each connected to a Passive Optical Network (PON) having protection therein where the OLT is in a protection group with one or more additional OLTs, and circuitry configured to maintain a state of the OLT in the protection group as one of Active and Standby, and toggle a pin between the pluggable module and the one of the switch and the router to indicate a change in the state.

The state is changed based on detection of a fault in the PON, independent of coordination with the one or more additional OLTs. When the state is Standby, the change in the state is based on detecting the fault, turning on the transmitter, and checking if the fault is not present after turning on the transmitter. When the state is Active, the change in the state is based on detecting the fault, and turning off the transmitter.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An Optical Line Terminal (OLT) comprising:

a transmitter and a receiver, each connected to a Passive Optical Network (PON) having protection therein where the OLT is in a protection group with one or more additional OLTs, and wherein the OLT is in a Standby state in which a PON interface of the OLT is off while Ethernet switching remains enabled for management; and circuitry configured to turn on the transmitter by turning on a laser of the OLT based on detection of a fault in the PON, and check if the fault is still detected after the transmitter is turned on by monitoring for resumption of PON activity after the laser has been turned on, responsive to the fault not being detected after the state of the transmitter is turned on, change the OLT to an Active state without requiring an explicit messaging channel between the OLT and the one or more additional OLTs to coordinate the changing the OLT to the Active state, and, responsive to the fault still being detected after the transmitter is turned on, turn off the transmitter.

2. The OLT of claim 1, wherein the circuitry is further configured to subsequent to changing the OLT to an Active state, notify a router associated with the OLT of the Active state.

3. The OLT of claim 1, wherein the circuitry is further configured to maintain a state of the OLT as one of the Standby state and the Active state, without coordination with the one or more additional OLTs.

4. The OLT of claim 1, wherein the OLT is a pluggable module being housed in an associated router.

5. The OLT of claim 4, wherein the circuitry is further configured to communicate the change to the Active state by toggling or pulsing a pin between the pluggable module and the associated router.

6. The OLT of claim 1, wherein the circuitry is further configured to responsive to a request from an associated router, communicate a status to the associated router.

7. The OLT of claim 6, wherein the status is communicated by the associated router reading a register in the circuitry.

8. A method comprising steps of:

in an Optical Line Terminal (OLT) including a transmitter and a receiver, each connected to a Passive Optical Network (PON) having protection therein where the OLT is in a protection group with one or more additional OLTs, wherein the OLT is in a Standby state in which a PON interface of the OLT is off while Ethernet switching remains enabled for management, turning on the transmitter by turning on a laser of the OLT based on detection of a fault in the PON; and checking if the fault is still detected after the transmitter is turned on by monitoring for resumption of PON activity after the laser has been turned on;

responsive to the fault not being detected after the state of the transmitter is turned on, changing the OLT to an Active state without requiring an explicit messaging channel between the OLT and the one or more additional OLTs to coordinate the changing the OLT to the Active state; and responsive to the fault still being detected after the transmitter is turned on, turning off the transmitter.

9. The method of claim 8, wherein the steps further include subsequent to changing the OLT to an Active state, notifying a router associated with the OLT of the Active state.

10. The method of claim 8, wherein the steps further include maintaining a state of the OLT as one of the Standby state and the Active state, without coordination with the one or more additional OLTs.

11. The method of claim 8, wherein the OLT is a pluggable module being housed in an associated router.

12. The method of claim 11, wherein the steps further include communicating the changing to the Active state by toggling or pulsing a pin between the pluggable module and the associated router.

13. The method of claim 8, wherein the steps further include responsive to a request from an associated router, communicating a status to the associated router.

14. The method of claim 13, wherein the status is communicated by the associated router reading a register in the circuitry.

15. An Optical Line Terminal (OLT), in a pluggable module configured to operate in one of a switch and a router, comprising:

a transmitter and a receiver, each connected to a Passive Optical Network (PON) having protection therein where the OLT is in a protection group with one or more additional OLTs, and circuitry configured to maintain a state of the OLT in the protection group as one of Active and Standby, wherein, when in Standby, a PON interface of the OLT is off while Ethernet switching remains enabled for management, wherein a change in the state from Standby to Active is based on detecting a fault in the PON, turning on the transmitter, and checking if the fault is not present after turning on the transmitter, responsive to the fault still being detected after the transmitter is turned on, turn off the transmitter, and toggle a pin including a Loss of Signal (LOS) pin between the pluggable module and the one of the switch and the router to indicate the change in the state, wherein the state is determined by the OLT based on PON fault detection without requiring an explicit messaging channel between the OLT and the one or more additional OLTs for coordination.

16. The OLT of claim 15, wherein the state is changed based on detection of a fault in the PON, independent of coordination with the one or more additional OLTs.

17. The OLT of claim 15, wherein, when the state is Active, the change in the state is based on detecting the fault, and turning off the transmitter.

* * * * *